US008429866B2

(12) United States Patent
Knight et al.

(10) Patent No.: US 8,429,866 B2
(45) Date of Patent: Apr. 30, 2013

(54) MODULAR SYSTEM FOR CLADDING EXTERIOR WALLS OF A STRUCTURE AND INSULATING THE STRUCTURE WALLS

(76) Inventors: Douglas James Knight, Deer Park, WA (US); David Allen Knight, Deer Park, WA (US); Kenneth Lee Knight, Deer Park, WA (US); Harley W. Simonson, Deer Park, WA (US); Joel Schwartz, North Vancouver (CA); Scott Croasdale, North Vancouver (CA)

( * ) Notice: Subject to any disclaimer, the term of this patent is extended or adjusted under 35 U.S.C. 154(b) by 0 days.

(21) Appl. No.: 12/928,151

(22) Filed: Dec. 6, 2010

(65) Prior Publication Data
US 2012/0137610 A1 Jun. 7, 2012

(51) Int. Cl.
*E04B 9/00* (2006.01)

(52) U.S. Cl.
USPC ............. 52/479; 52/302.3; 52/478; 52/481.1; 52/483.1; 52/506.03

(58) Field of Classification Search ............... 52/169.11, 52/302.3, 378–379, 407.1, 407.5, 478, 481.1, 52/479, 483.1, 506.01, 506.03, 506.04
See application file for complete search history.

(56) References Cited

U.S. PATENT DOCUMENTS

| 519,952 | A | | 5/1894 | Hayes | |
|---|---|---|---|---|---|
| 3,839,839 | A | * | 10/1974 | Tillisch et al. | 52/846 |
| 4,009,549 | A | | 3/1977 | Hala | |
| 4,074,486 | A | * | 2/1978 | Grearson | 52/235 |
| 4,506,482 | A | | 3/1985 | Pracht et al. | |
| 4,680,905 | A | * | 7/1987 | Rockar | 52/200 |
| 4,897,976 | A | * | 2/1990 | Williams et al. | 52/281 |
| 5,065,559 | A | * | 11/1991 | Zegel et al. | 52/239 |
| 5,092,100 | A | * | 3/1992 | Lambert et al. | 52/774 |
| 5,094,052 | A | * | 3/1992 | Gudmundsson et al. | 52/238.1 |
| 5,216,859 | A | | 6/1993 | Moreno et al. | |
| 5,285,607 | A | | 2/1994 | Somerville | |
| 5,379,561 | A | * | 1/1995 | Saito | 52/235 |
| 5,473,851 | A | | 12/1995 | Northrup, Jr. | |
| 5,619,834 | A | | 4/1997 | Chen | |
| 5,644,883 | A | * | 7/1997 | Menchetti | 52/489.1 |
| 5,749,192 | A | * | 5/1998 | Menchetti | 52/489.1 |
| 5,758,464 | A | * | 6/1998 | Hatton | 52/404.1 |
| 5,761,864 | A | * | 6/1998 | Nonoshita | 52/302.3 |
| 5,799,454 | A | * | 9/1998 | Andersson et al. | 52/302.3 |
| 5,816,008 | A | * | 10/1998 | Hohmann | 52/565 |
| 5,953,883 | A | * | 9/1999 | Ojala | 52/794.1 |
| 5,970,671 | A | | 10/1999 | Bifano et al. | |

(Continued)

FOREIGN PATENT DOCUMENTS

| CH | 690 967 | 3/2001 |
|---|---|---|
| DE | 27 02 459 | 7/1977 |

(Continued)

*Primary Examiner* — Brian Glessner
*Assistant Examiner* — Joshua Ihezie
(74) *Attorney, Agent, or Firm* — William A. Jeckle

(57) ABSTRACT

A modular system for cladding exterior walls of a structure and insulating the structure walls provides thermally isolated vertical girders secured to a structural wall. The thermally isolated vertical girders positionally maintain insulation adjacent the structure and provide a means for mounting exterior wall cladding to the structure. Planar wall panels carrying exterior wall cladding elements mount directly or indirectly to the vertical girders. Corner elements, carrying exterior corner cladding elements interconnect with the underlying system and visually appear to interconnect with adjacent edge portions of the planar wall panels.

12 Claims, 11 Drawing Sheets

U.S. PATENT DOCUMENTS

| | | | |
|---|---|---|---|
| 6,076,320 A * | 6/2000 | Butler | 52/294 |
| 6,125,608 A * | 10/2000 | Charlson | 52/847 |
| 6,138,423 A | 10/2000 | Poutanen et al. | |
| 6,250,035 B1 | 6/2001 | Bristow et al. | |
| 6,401,417 B1 * | 6/2002 | Leblang | 52/481.1 |
| 6,594,965 B2 * | 7/2003 | Coulton | 52/302.1 |
| 6,745,531 B1 * | 6/2004 | Egan | 52/302.1 |
| 6,786,013 B2 * | 9/2004 | Coulton | 52/198 |
| 7,043,884 B2 * | 5/2006 | Moreno | 52/235 |
| 7,127,858 B2 * | 10/2006 | Layfield | 52/407.1 |
| 7,191,570 B1 * | 3/2007 | Eaton | 52/506.09 |
| 7,254,925 B2 * | 8/2007 | Stefanutti et al. | 52/309.9 |
| 7,421,826 B2 * | 9/2008 | Collins et al. | 52/302.1 |
| 7,617,638 B1 * | 11/2009 | Slama et al. | 52/95 |
| 2002/0194805 A1 * | 12/2002 | Arseneau et al. | 52/481.1 |
| 2003/0037499 A1 * | 2/2003 | Coulton | 52/302.3 |
| 2005/0204660 A1 | 9/2005 | Tiirola | |
| 2005/0284053 A1 * | 12/2005 | Grunewald et al. | 52/235 |
| 2007/0193151 A1 * | 8/2007 | Anderson | 52/302.3 |
| 2007/0204541 A1 * | 9/2007 | Sade | 52/302.1 |
| 2009/0094923 A1 * | 4/2009 | Weir et al. | 52/506.01 |
| 2010/0146893 A1 * | 6/2010 | Dickinson | 52/302.3 |
| 2010/0287865 A1 * | 11/2010 | Hatzinikolas | 52/302.1 |
| 2012/0131872 A1 * | 5/2012 | Kim | 52/483.1 |

FOREIGN PATENT DOCUMENTS

| | | |
|---|---|---|
| DE | 32 15 392 | 10/1983 |
| EP | 1 233 118 A2 | 8/2002 |
| EP | 1 310 612 A2 | 5/2003 |

* cited by examiner

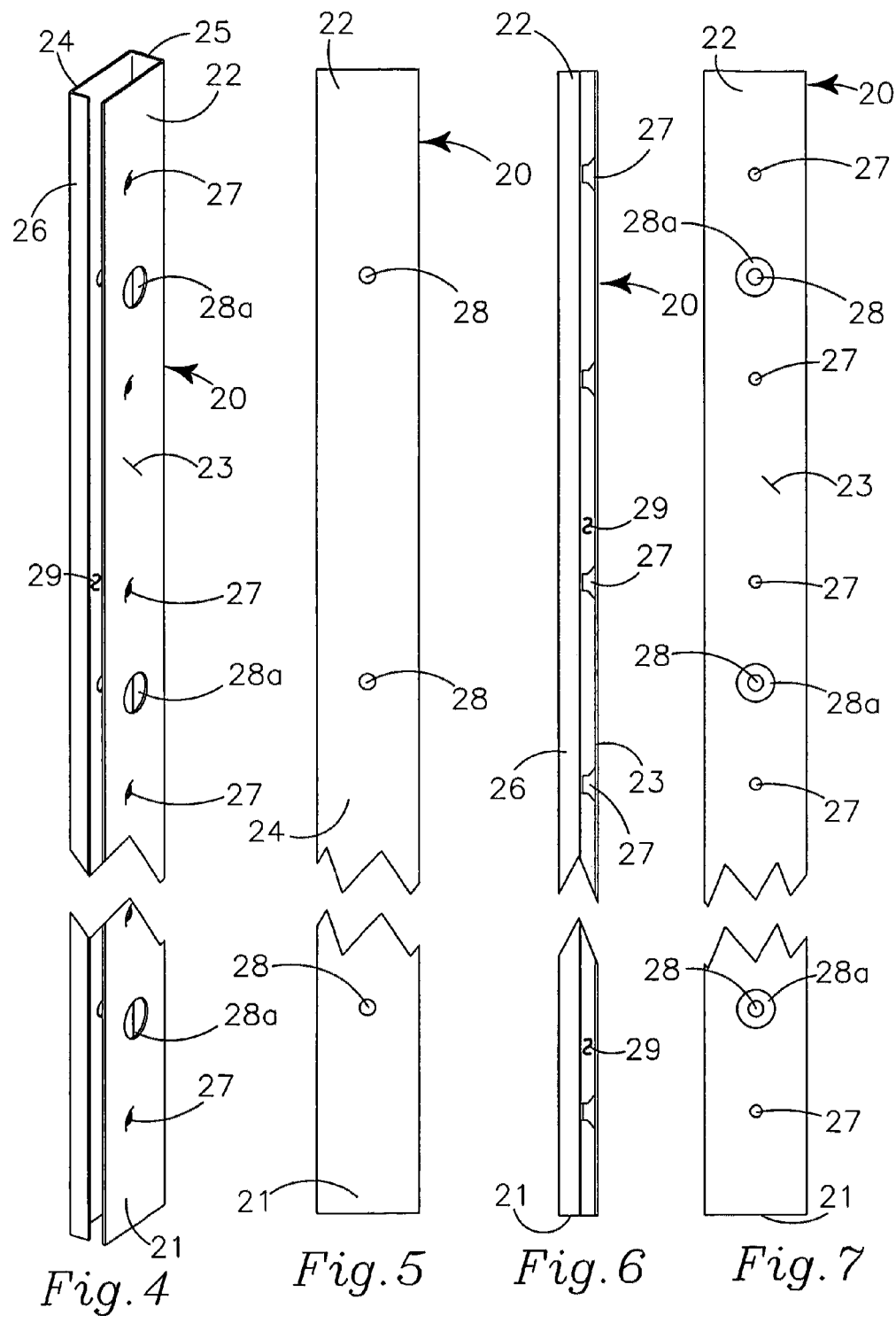

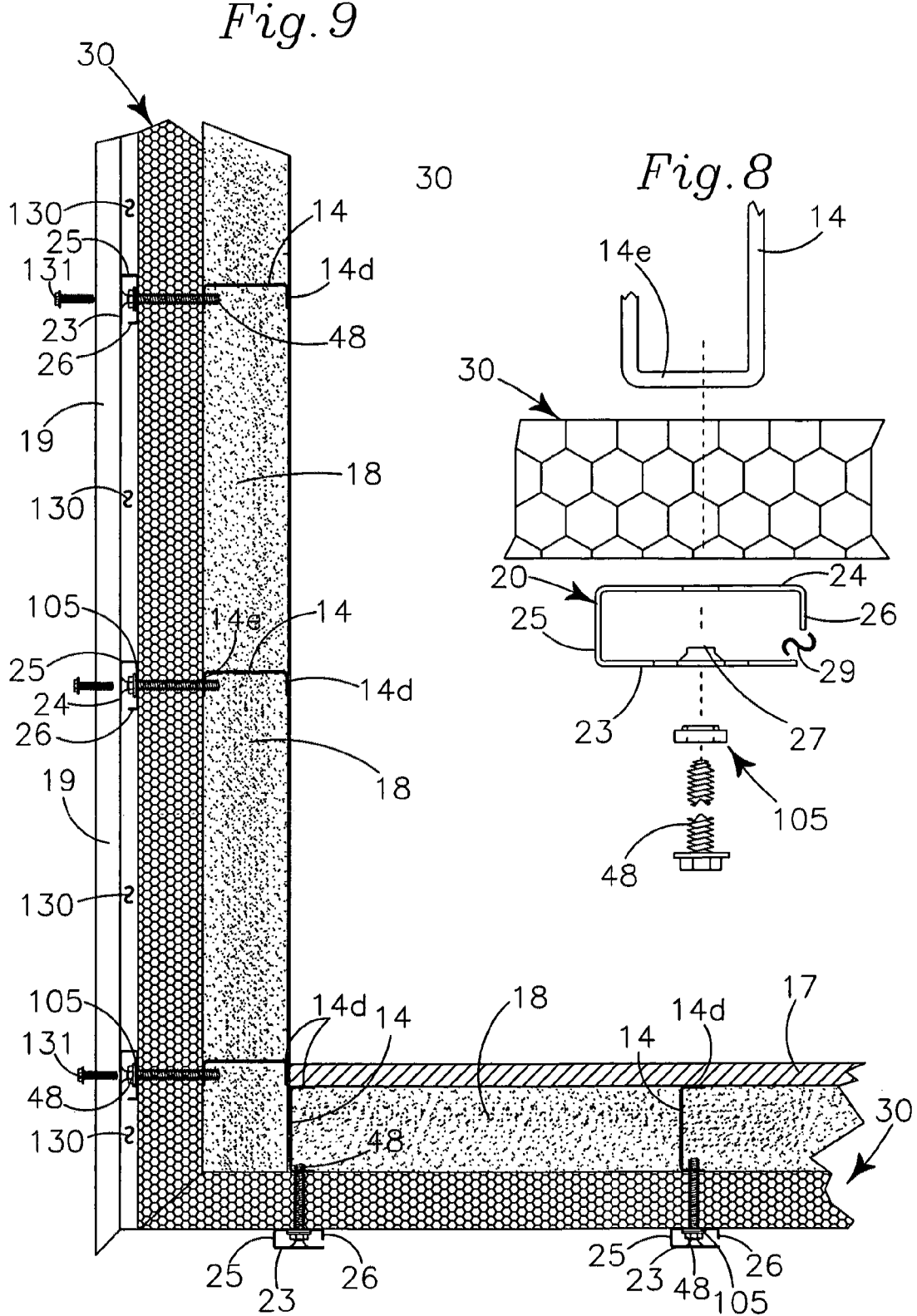

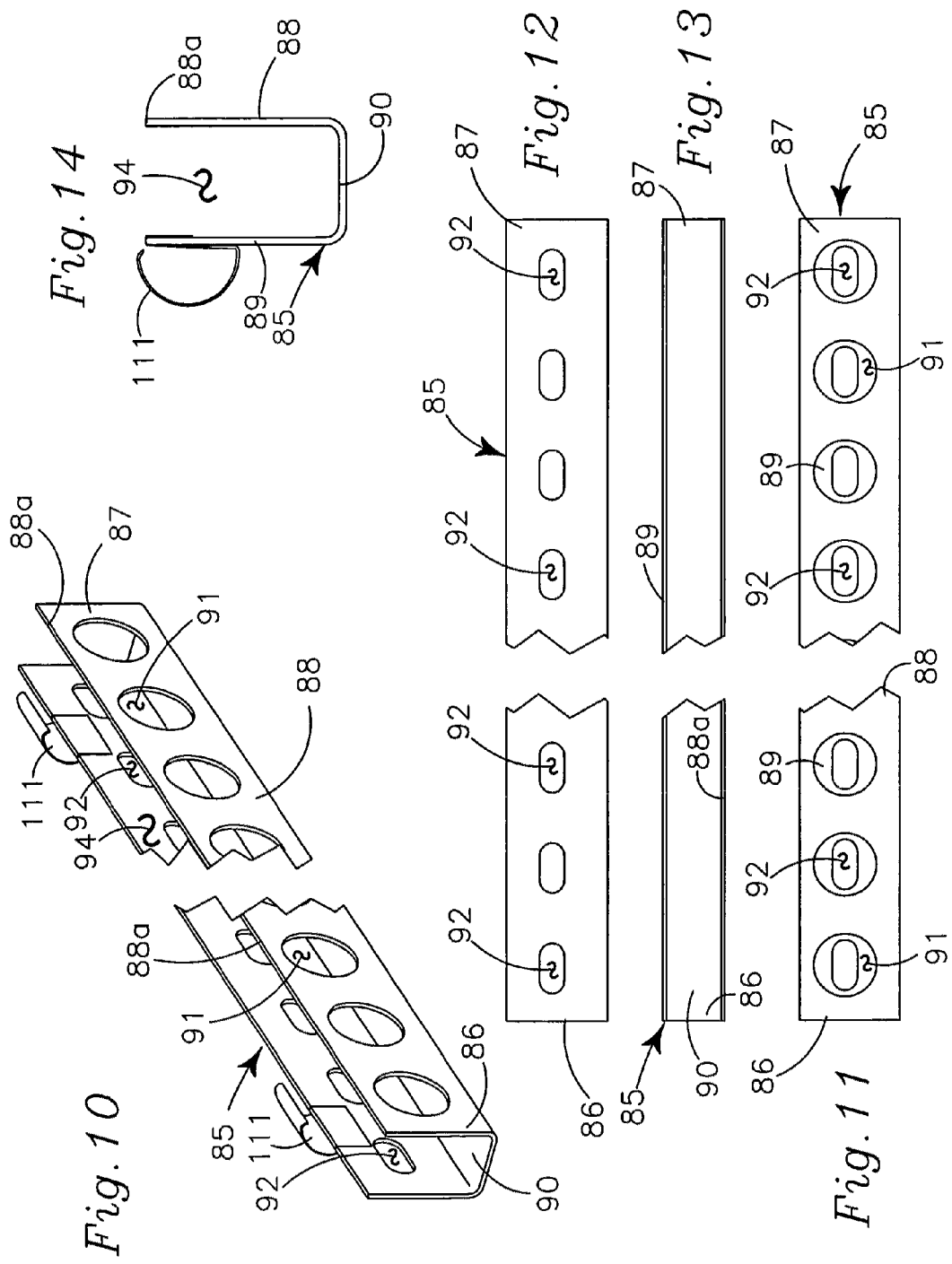

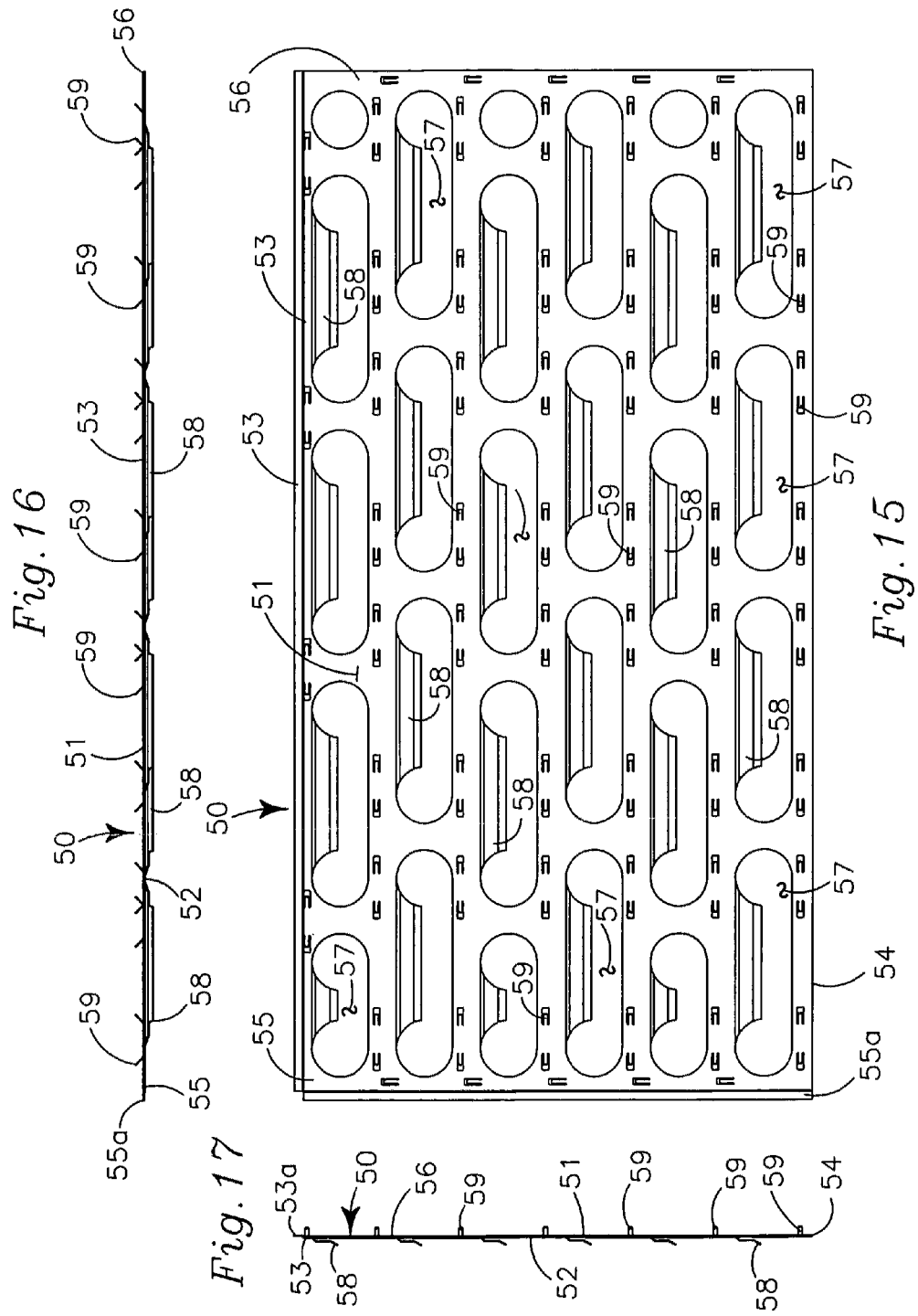

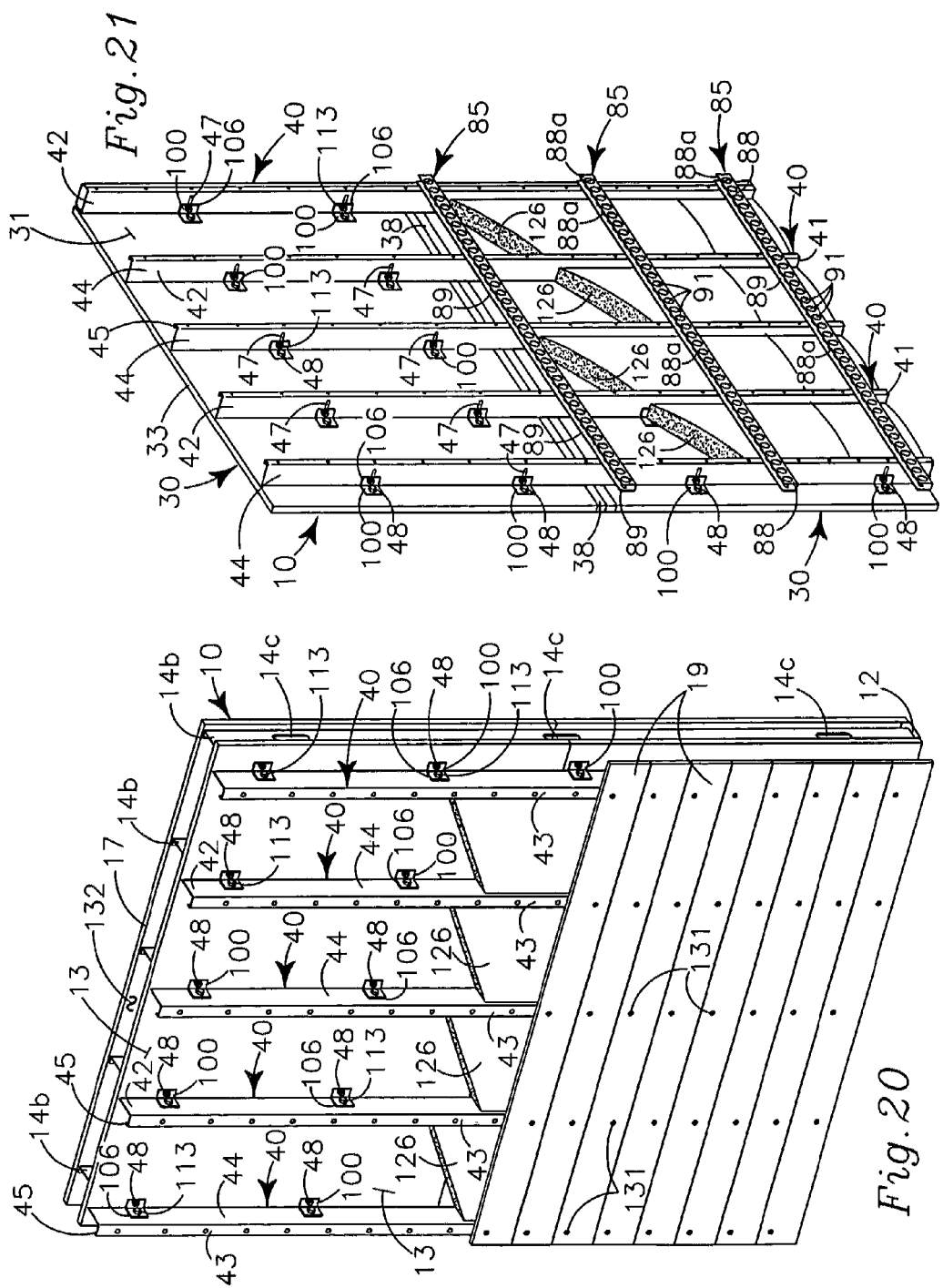

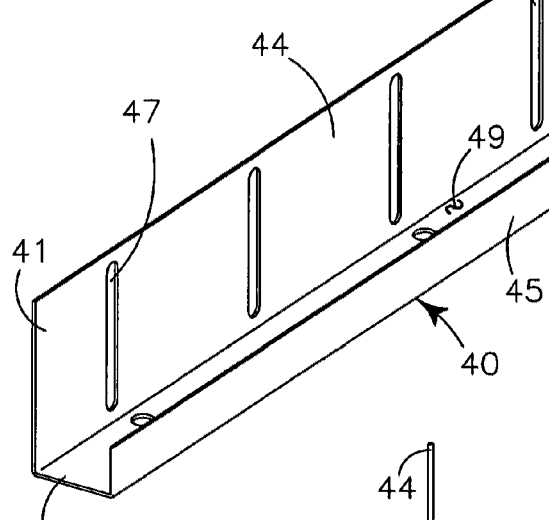
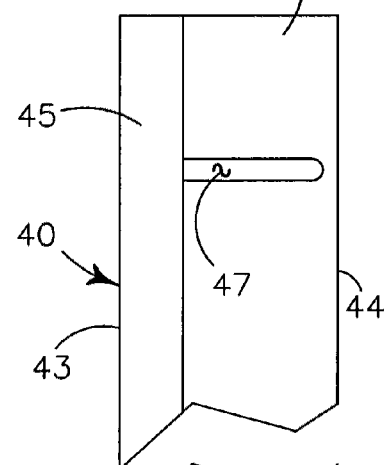
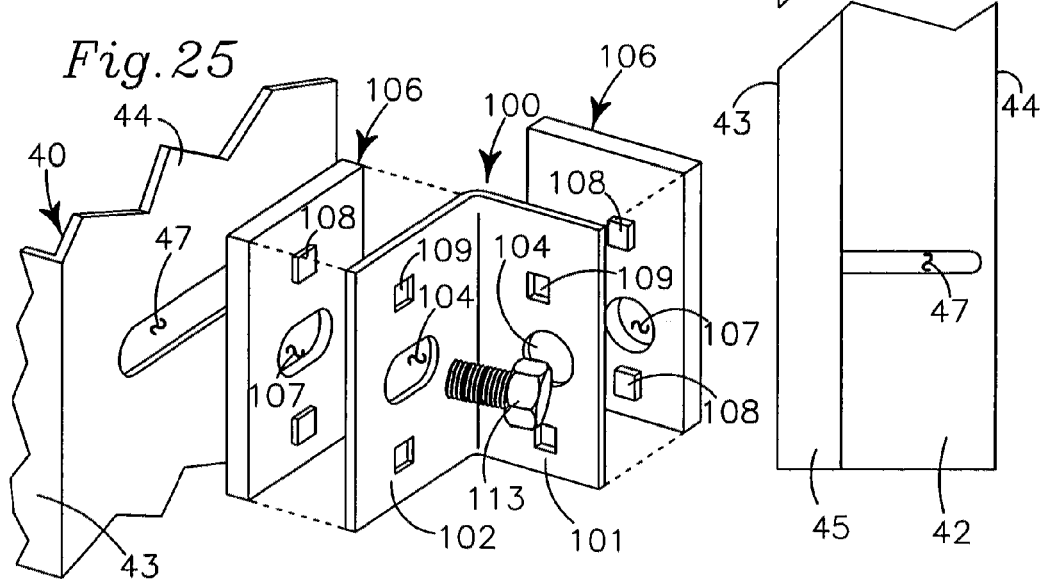

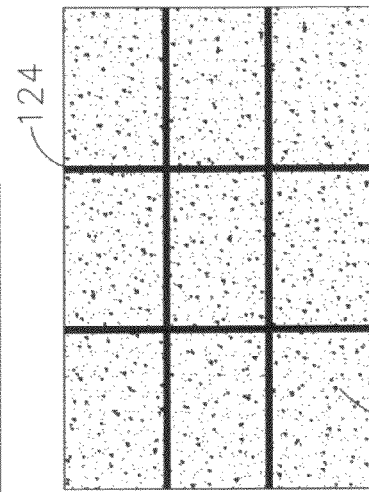
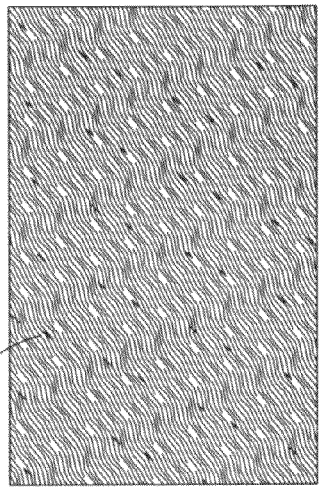
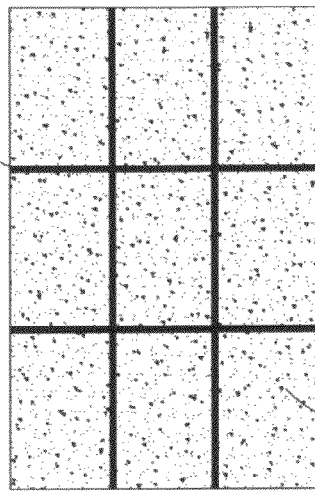
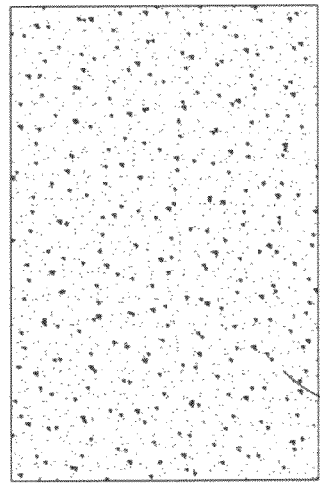
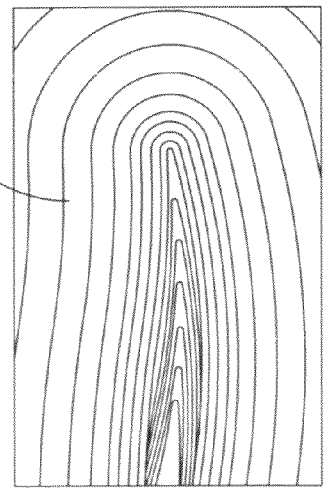
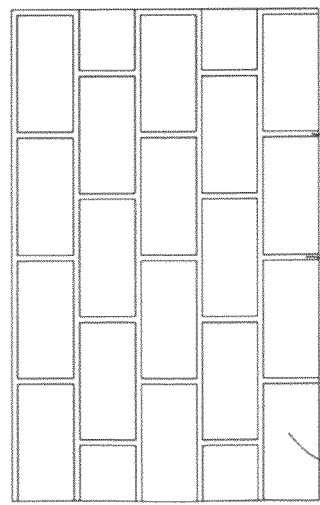
Fig.30  Fig.28  Fig.27  Fig.29  Fig.26

MODULAR SYSTEM FOR CLADDING EXTERIOR WALLS OF A STRUCTURE AND INSULATING THE STRUCTURE WALLS

RELATED APPLICATIONS

A U.S. Design Patent Application, Application No. 29/348,952 for a "J" Channel was previously filed on Feb. 25, 2010. The "J" Channel is one component of the modular system disclosed and claimed herein. The inventors of U.S. Design Patent Application No. 29/348,952 are co-inventors of the instant invention.

BACKGROUND OF INVENTION

1. Field of Invention

This invention relates to static structures, and more particularly to a modular system for mounting and supporting thermal insulation and exterior cladding on a structure.

2. Background and Description of Prior Art

It is well known in the construction field to build exterior structure walls with plural spaced apart parallel vertical studs of wood or metal. The studs communicate, at a bottom end portion with a wall plate that is anchored to a lower support which may be a building foundation, and at an upper end portion with a ceiling plate that extends generally perpendicular to the studs and parallel with the wall plate. A weather resistive barrier formed of material such as asphalt impregnated paper, plastic sheeting, building wrap or similar product may be attached to outward facing edges of the wall studs, extending from stud to stud and from floor plate to ceiling plate. The weather resistive barrier inhibits flow of air and moisture through any gaps that may exist in the wall assembly.

Exterior cladding, which may also be called "sheathing" in materials such as, but not limited to, plywood, oriented strand board (OSB), wafer board, metallic sheeting, lapboard, gypsum sheathing and the like, may be fastened to the outward facing edges of the wall studs outward of the weather resistive barrier. The exterior cladding also typically extends from wall stud to wall stud and from the wall plate to the ceiling plate. The exterior cladding may provide the exterior surface of the structure or may itself be covered with another exterior cladding, exterior covering or exterior coating.

Services such as plumbing, electrical, tele-communications and the like may be provided for by forming horizontally aligned holes in the studs and placing conduit, or the like, through the horizontally aligned holes. Thereafter, wiring, pipes and the like may be threaded into and through the conduit or directly through the holes as desired.

Commonly, insulation is installed directly against the weather resistive barrier, or directly against the inward facing surface of the exterior cladding depending upon the type of wall assembly, in the spaces between the wall studs extending from the floor plate to the ceiling plate. The insulation may be of various forms including fiberglass batting, mineral wool, recycled paper, cellulose or the like. The object is to "fill" the space between the wall studs to limit thermal transfer from the interior of the structure wall to the exterior of the structure wall, and visa versa depending upon the structure's interior operating conditions and the outside climate.

Alternatively, expanding foam-type insulation or the like may be added to the spaces between the wall studs in place of the fiberglass batting, mineral wool, cellulose or other form of insulation. If expanding foam-type insulation is used, it is desirable to make the expanding foam-type insulation flush with the inward facing edges of the wall studs so that the insulation does not protrude beyond the inward facing edges of the wall studs which may cause interior sheathing such as gypsum board to "bulge" or otherwise not properly "seat" against the inward facing edges of the wall studs.

A vapor barrier such as plastic sheeting or the like may be attached to the inward facing edges of the wall studs extending from wall stud to wall stud and from the ceiling plate to the floor plate enclosing the insulation between the wall studs and between the inner vapor barrier and outer weather resistive barrier. In some instances the vapor barrier may be a surface coating that is applied to the outward facing surface of the interior wall sheathing.

Interior sheathing, such as drywall, gypsum board, paneling or the like is attached to the inward facing edge portions of the wall studs, the floor plate and the ceiling plate and access holes are cut in the interior sheathing to provide access to the electrical boxes, plumbing fittings and the like.

One drawback to such wall framing methods is that such methods create thermal bridges in the structure's walls which decrease the effectiveness of insulation and conduct thermal energy through the wall structure from the inside to the outside, and from the outside to the inside depending upon the outside temperatures and the inside operating conditions.

Although insulation is provided between the wall studs, the studs themselves provide less insulative value and walls formed by such methods are not thermally efficient because thermal transfer occurs through the wall studs. With metal wall studs, such as those commonly used in commercial construction, the effectiveness of insulation between the metal wall studs may be reduced by more than fifty percent (50%).

For example, a wall assembly having exterior cladding and interior sheathing supported by plural parallel spaced apart 2"×6" wood wall studs therebetween and having T-21 rated fiberglass batting type insulation filling the spaces between the wood wall studs has an effective R-rating of approximately R-18 due to the thermal transfer through the wood wall studs. If the same wall assembly is constructed using steel wall studs between the exterior cladding and the interior sheathing the effective R-value drops to approximately R-8 because of the thermal loss through the steel wall studs.

Even when additional layers of thermal insulation are placed on the exterior of a structure, the thermal effectiveness of such insulation is reduced by the common practice of attaching exterior cladding directly to the outward facing surface of the insulation with metal framing elements that penetrate through the insulation thereunder to attach to the underlying wall studs for structural support.

Adding insulation to the exterior of a structure is also known to reduce condensation within the wall, which occurs when moisture-laden air comes into contact with a surface having a temperature below the dew-point temperature of the moisture-laden air. In a wall assembly, condensation usually occurs during the cold weather months on the inward facing surface (back side) of the exterior cladding when warm moisture laden air from the interior of the structure penetrates the wall assembly and contacts, the cold inward facing surface of the exterior cladding. In warm weather months, the condensation usually forms on the outward facing surface of the insulation by warm air penetrating the wall from the outside and contacting the cooler outward facing surface of the insulation which can lead to moisture saturation of the insulation which degrades the effectiveness of the insulation. Without proper design and engineering, attaching insulation directly to the exterior of a structure can be ineffective and can even be detrimental to the useful life of the wall assembly.

Another drawback to such construction methods is the limited number of options for cladding the exterior of a light-frame structure. Although some variety of exterior claddings are available, such as lap board, metal siding, paneling and the like, such cladding is typically limited to light weight coverings that can be supported by hanger-type wall attachments. Cladding exterior walls with heavy materials such as brick, stone and the like has previously been difficult because the weight of such coverings must be supported by the wall attachments. Overcoming this difficulty leads to additional costs and expenses for larger foundations for vertical support, stronger beams for horizontal support and additional labor costs.

A further drawback to such construction methods is the limited ability to refurbish existing structures by changing the exterior. Generally, when an existing structure is "re-clad" the options available are limited to replacing the existing cladding, or fastening a similar type of cladding over the top of the existing cladding. Unfortunately, at times this is not feasible because the existing cladding is too deteriorated to allow stable attachment of the new cladding system. Further, in some instances the vertical "plumbness" of an exterior wall might be so poor that it is not feasible or practical to attach a new exterior cladding to the existing structure. Finally, attaching a new exterior cladding has the ability to alter the building's footprint sufficiently to cause property line setback problems by extending the building's walls outwardly.

Evolving construction standards with increased emphasis on energy efficiency, "being green" and limiting greenhouse gas emissions have required construction methods and techniques to likewise change to focus on the energy efficiency of structures. One way to increase the energy efficiency of a structure is to add insulation to the exterior of the structure. Another is to minimize, or if possible eliminate thermal bridges that allow energy loss. A third is to improve moisture management which improves durability and thermal performance of the wall assembly. An even more effective solution is to do all three; add insulation to the exterior of a structure while effectively managing moisture and eliminating and minimizing thermal bridges. The combination of these efforts is known as "continuous insulation" which is defined in various building codes, such as, but not limited to, ASHREA 90.1 as insulation that is uninterrupted by framing members, except fasteners (screws, nails) and is installed either inboard or outboard of the wall.

The precise definition of "Continuous Insulation" as set forth in the proposed Seattle Energy Code of 29 Apr. 2010 with which Applicants are most familiar, defines continuous insulation as follows:

CONTINUOUS INSULATION (C.I.): Insulation that is continuous across all structural members without thermal bridges other than fasteners (i.e., screws and nails) and service openings. It is installed on the interior or exterior or is integral to any opaque surface of the building envelope. Insulation installed between metal studs, z-girts, z-channels, shelf angles, or insulation with penetrations by brick ties and offset brackets, or any other similar framing is not considered continuous insulation, regardless of whether the metal is continuous or occasionally discontinuous or has thermal break material.

What is needed is a system that allows exterior cladding to be installed on new structures and onto existing structures, and allows the walls to be insulated having a high degree of thermal insulation while minimizing or eliminating thermal bridges and moisture management problems. The system must accommodate a variety of exterior claddings and must allow the structure to be provided with a new appearance, including an appearance of being constructed a brick, stone or the like. The system must comply with evolving construction standards including the new ASHRE 90.1 standards, including the standards for continuous installation. The system must be economical and efficient and provide sufficient flexibility and structural integrity to allow a user to clad the exterior of a structure as desired and simultaneously preserve the desirable features of known light frame construction methods and systems.

Our system overcomes various drawbacks of known construction apparatus, methods and techniques by providing a modular system that preserves user flexibility in the exterior cladding of a structure and maximizes the insulative capabilities by providing a continuously insulated structure having no or minimal thermal bridges that allow thermal energy loss.

Our system provides vertical girders that are attached to the underlying structure in a manner that the vertical girders are thermally isolated from the underlying structure to prevent creation of thermal bridges. The vertical girders secure insulation to the structure and provide an anchor for the exterior cladding which may be either directly or indirectly mounted thereto.

Rigid panels of insulation between the inner surface of the vertical girders and the outward edges of the vertical wall studs, or exterior of the structure, enhance energy efficiency of the structure. The rigid panels may have a core of expanded foam-type insulation and may be covered with a flame resistant covering. Joints between adjacent rigid insulative panels are sealed to eliminate any gaps through which air and moisture might otherwise pass.

A wall panel hanging system fastened to outward facing surfaces of the vertical girders provides a "U" channel upon which exterior cladding or wall panels may be releasably secured. A desired exterior cladding may be fastened to an exterior surface of the wall panels. Corner elements carrying complimentary sections of the desired exterior cladding are supported by the system at the structure corners.

Flexibly resilient grout having a visual appearance of masonry grout fills the gaps between the cladding elements to accommodate thermal expansion and unforeseen vibrations that might otherwise allow cracking therein.

A rainscreen between inner surface of the exterior cladding and the outer surface of the insulation provides a pressure equalized drain cavity that prevents moisture from passing from the exterior into the wall assembly, reduces condensation, and properly manages moisture. The pressure equalized drain cavity is configured to comply with fire standards to prevent formation of a "chimney" between the inner surface of the exterior wall cladding and the outer surface of the insulation.

Thermal isolators reduce thermal transfer between metal to metal connections and create a "bottle neck" for heat transfer between the vertical girders and the underlying structure and maximize the effectiveness of the insulation.

Our system increases the "effective R Value" of structures by providing a more energy efficient wall structure that loses less heat through thermal conduction through the wall structure.

Our system lowers the likelihood of condensation within the wall structure effectively manages moisture and minimizes energy losses related to thermal bridging.

Further, our system satisfies evolving and changing building codes and regulations, such as but not limited to ASHRAE 90.1 standards which are the baseline energy efficiency guidelines used worldwide for promotion of energy efficiency, energy conservation and "greenness".

Our system allows the exterior of a structure to be clad in a material that has the appearance and texture of masonry, brick, stone and the like, but the cladding system does not have the weight of such construction and therefore the foundation and other underlying support structures of the building need not have the massiveness or therefore the cost and expense of support structures that would be necessary to support construction with such heavy materials.

Our invention does not reside in any one of the identified features individually, but rather in the synergistic combination of all of its structures, which give rise to the functions necessarily flowing therefrom as hereinafter specified and claimed.

SUMMARY

A modular system for cladding exterior walls of a structure and insulating the structure walls provides thermally isolated vertical girders secured to an structure exterior wall. The thermally isolated vertical girders positionally maintain insulation adjacent the structure wall and provide a means for mounting exterior wall cladding to the structure. Wall panels and corner elements carrying exterior wall cladding elements mount directly or indirectly to the vertical girders.

In providing such a modular system it is:

a principal object to provide a modular system for insulating a structure wall and supporting exterior wall cladding.

a further object to provide a modular system that minimizes thermal energy transfer from the exterior of a wall to the interior of a wall and from the interior of a wall to the exterior of a wall.

a further object to provide a modular system that complies with building codes for energy efficiency, thermal energy savings and "greenness".

a further object to provide a modular system that thermally isolates the vertical girders from the structure wall.

a further object to provide a modular system that prevents penetration and passage of moisture into the structure wall.

a further object to provide a modular system that may be installed on a new structure.

a further object to provide a modular system that may be installed on an existing structure.

a further object to provide a modular system that supports a variety of exterior claddings.

a further object to provide a modular system that decreases the cost of insulating a structure and increases the effectiveness of the insulation.

a further object to provide a modular system that allows a structure's exterior walls to be re-plumbed to vertical.

a further object to provide a modular system that will support exterior wall cladding panels.

a further object to provide a modular system that converts tensive forces exerted on the fasteners by the weight of the exterior cladding into compressive forces exerted on the insulation.

a further object to provide a modular system that is ASHRE 90.1 compliant.

a further object to provide such a modular system that supports brick cladding.

a further object to provide a modular system that supports masonry cladding.

a further object to provide a modular system that supports stone cladding.

a further object to provide a modular system that supports metallic cladding.

a further object to provide modular system that eliminates the need for massive foundations to support the weight of brick, stone and masonry cladding.

a further object to provide a modular system that reduces condensation within the wall assembly and effectively manages moisture within the wall assembly.

a still further object to provide a modular system that meets building standards for continuous insulation.

Other and further objects of our invention will appear from the following specification and accompanying drawings which form a part hereof. In carrying out the objects of our invention it is to be understood that its structures and features and steps are susceptible to change in design and arrangement and order with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 4 is an isometric partial cut-away front, side, and end view of a segment of vertical girder.

FIG. 5 is an orthographic partial cut-away back view of the segment of vertical girder of FIG. 4.

FIG. 6 is an orthographic partial cut-away side view of the segment of vertical girder of FIG. 4.

FIG. 7 is an orthographic partial cut-away front view of the segment of vertical girder of FIG. 4.

FIG. 8 is an enlarged exploded orthographic end view of the segment of vertical girder showing a fastener and thermal isolator aligned for installation with an insulative panel and a metal wall stud.

FIG. 9 is an orthographic top, downward looking view of a wall corner portion similar to that of FIG. 2.

FIG. 10 is an isometric partial cut-away front, top and end view of a segment of U-shaped hanger for supporting wall panels with insulation clips attached to the inner side portion.

FIG. 11 is an orthographic partial cut-away front view of a segment of U-shaped hanger similar to that of FIG. 10 less the insulation clips.

FIG. 12 is an orthographic partial cut-away back view of a segment of U-shaped hanger similar to that of FIG. 10 less the insulation clips.

FIG. 13 is an orthographic partial cut-away top downward looking view of a segment of U-shaped hanger similar to that of FIG. 10 less the insulation clips.

FIG. 14 is an enlarged orthographic end view of a segment of U-shaped hanger similar to that of FIG. 10.

FIG. 15 is an orthographic front view of a wall panel less exterior cladding.

FIG. 16 is an orthographic top edge view of the wall panel of FIG. 15.

FIG. 17 is an orthographic end view of the wall panel of FIG. 15.

FIG. 20 is an isometric front, top and side view of a structure wall showing J-Channel girders fastened to the wall with angle brackets and the wall partially insulated and partially clad with exterior cladding.

FIG. 21 is an isometric front, top and side view of a structure wall showing U-shaped hangers attached to the J-Channel girders to support wall panels.

FIG. 22 is an isometric partial cut-away back, end, and side view of a section a J-Channel girder.

FIG. 23 is an enlarged orthographic end view of the section of J-Channel girder of FIG. 22.

FIG. 24 is an orthographic partial cut-away side view of a section of J-Channel girder similar to that of FIG. 22.

FIG. 25 is an enlarged exploded isometric view of two bracket thermal isolators aligned with an angle bracket and a J-Channel girder.

FIG. 26 is an orthographic front view of a wall panel clad with brick-like tiles.

FIG. 27 is an orthographic front view of a wall panel covered with stucco-type masonry.

FIG. 28 is an orthographic front view of a wall panel covered with large tiles.

FIG. 29 is an orthographic front view of a wall panel covered with stone.

FIG. 30 is an orthographic front view of a wall panel covered with metal.

DESCRIPTION OF PREFERRED EMBODIMENT

Figure 1:
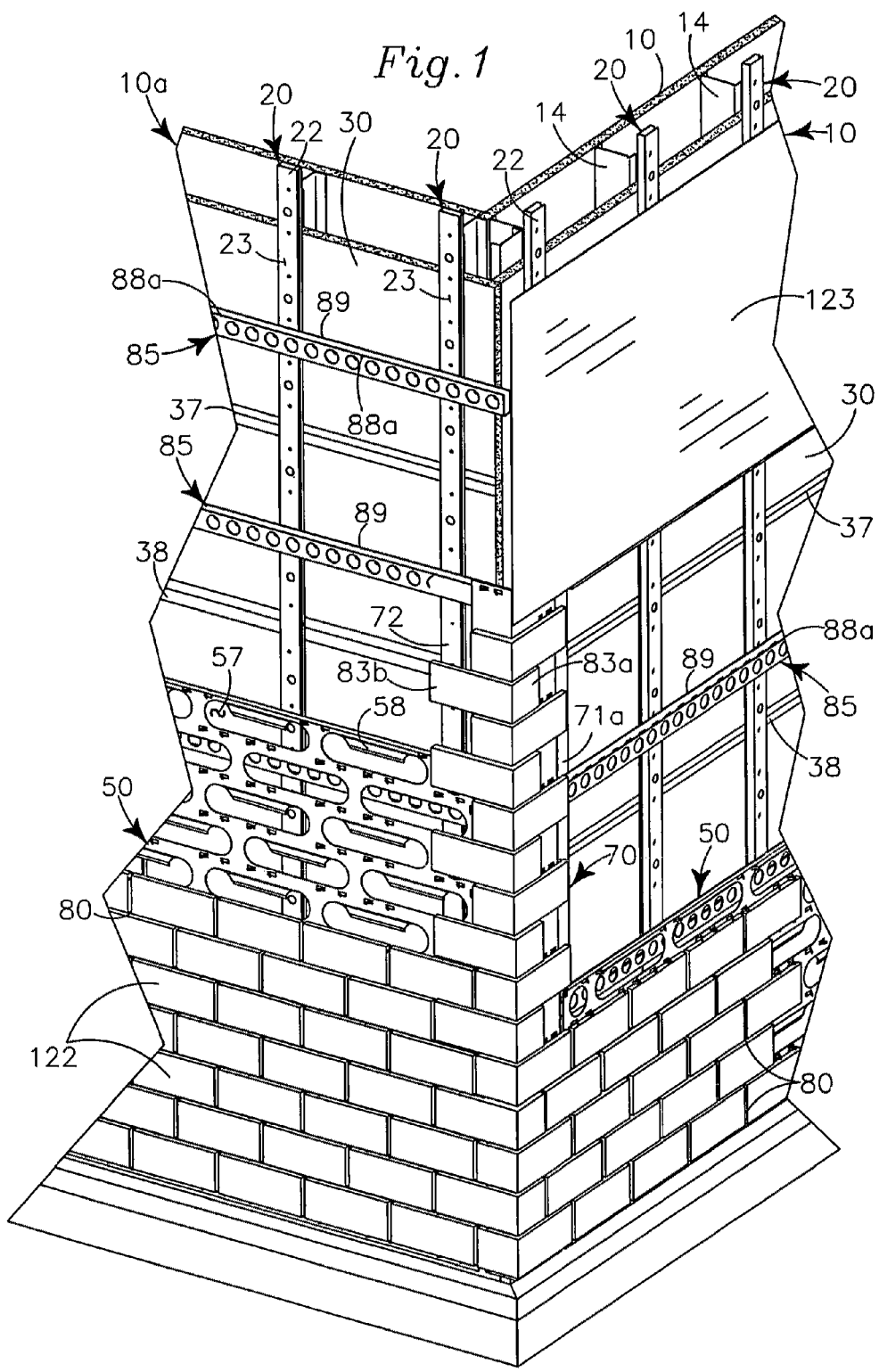
FIG. 1 is an isometric partial cutaway view of an exterior corner of a structure showing U-shaped hangers attached to vertical girders and supporting brick tile covered wall panels, metal wall panels, and corner elements.

As used herein, the term "outer", its derivatives and grammatical equivalents refers to that portion of our system that is proximate exterior of a structure. The term "inner", its derivatives and grammatical equivalents refers to that portion of our, system that is proximate interior of the structure. The term "lower", its derivatives and grammatical equivalents refers to that portion of our system that is vertically proximate foundation of the structure. The term "upper" its derivatives and grammatical equivalents refers to that portion of our system that is vertically distal from the foundation.

Our modular system for cladding exterior walls of a structure and insulating the structure walls generally provides vertical girders 20, 40, insulation panels 30, corner elements 70, U shaped hangers 85, wall panels 50 and exterior cladding 19.

Figure 2:
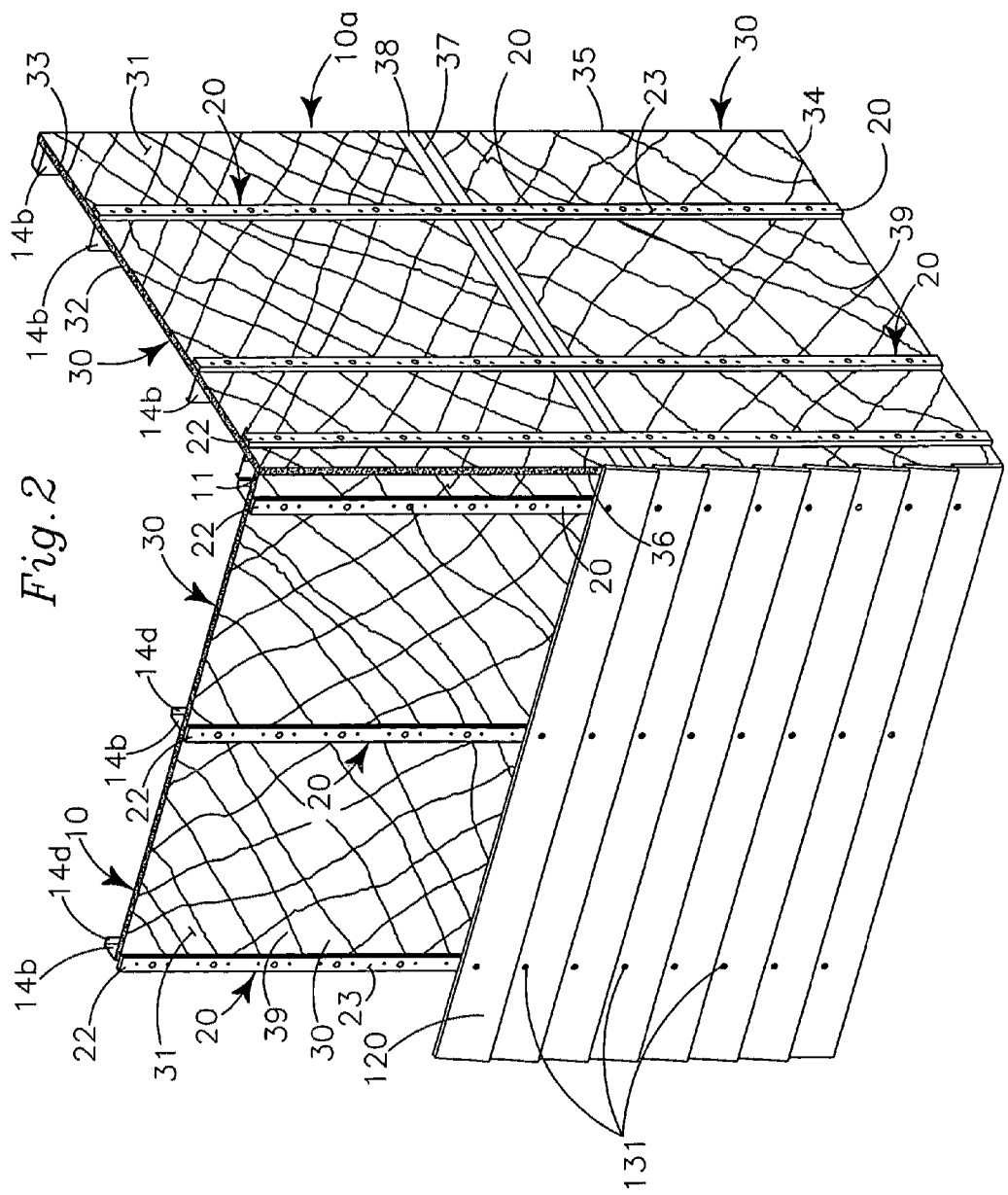
FIG. 2 is an isometric top and side view of an exterior corner portion of a wall showing insulative panels supported on metal wall studs, vertical girders outside the insulative panels and one of the walls portionally clad with lap board type exterior cladding.

As shown in FIG. 2, a structure wall 10 is commonly formed of plural spaced apart vertical wall studs 14 that communicate between a wall plate 12 at a first lower end portion 14a and a ceiling plate (not shown) at a second upper end portion 14b. The studs 14 may be formed of a variety of materials including but not limited to steel, aluminum, wood, plastic and composite and are rigidly interconnected to the wall plate 12 and to the ceiling plate (not shown) by known means. The wall plate 12 may communicate with a building foundation which provides vertical support for the wall 10, or the wall plate 12 may be supported by a floor portion (not shown) when the building has more than one level. An adjoining wall 10a is typically formed of the same materials and communicates with first wall 10 at adjacent edge portions forming corner 11 which may be any of a variety of angles. Window openings (not shown) and door openings (not shown) may be defined in the wall 10 by adjusting placement of the wall studs 14 and by installing sills (not shown) communicating between the wall studs 14.

Each wall stud 14 has an inward facing edge portion 14d and an opposing outward facing edge portion 14e. Utility holes 14c may be formed in each wall stud 14 for passage of conduits 15 and the like therethrough. Utility boxes 16 for light switches, electrical outlets and the like may be spacedly arrayed about the wall studs 14.

Depending upon the construction technique being used, and the engineering and architectural design for the project, exterior cladding or sheathing such as plywood, oriented strand board (OSB), or the like may be attached to outward facing edge portions 14c of the wall studs 14 prior to installation of a weather resistant barrier (not shown) and prior to installation of insulation panels 30.

Insulation panels 30 are planar and rigid and in the preferred embodiment are formed of foam glass, foamed plastics, thermo plastics, or thermo-sets, examples of which include, but are not limited to, expanded polystyrene (EPS), extruded polystyrene (XPS), and polyisocyanurate (Poly-Iso), some of which are made by the DOW® Chemical Company of Midland Mich., Owens Corning, Inc., Johns Manville, Inc., and IKO, Inc., of Canada. The insulation panels 30 provide a thermal barrier that inhibits thermal conductivity therethrough and provides additional protection from moisture penetration to reduce condensation and moisture problems within the wall 10 assembly.

The density of the foam forming the insulative panel 30 may be varied to adjust thermal resistance, compressive strength and resistance to moisture penetration. Each planar insulation panel 30 has a top edge 33, a bottom edge 34, a first lateral edge 35, a second lateral edge 36, an outward facing side 31 and an inward facing side 32. In the preferred embodiment the inward facing side 32 and the outward facing side 31 of each insulation panel 30 are surface covered with a permanent coating, covering or sheeting 39 formed of a material which provides flame resistance and increases resistance to moisture penetration, such as but not limited to metal foil. In the preferred embodiment the insulation panel 30 is formed of polyisocyanurate (Poly-Iso) because Poly-Iso is more fire resistant than XPS or EPS; Poly-Iso is resistant to crushing and Poly-Iso has greater thermal resistance than XPS or EPS. The crush resistance of the insulative panel 30 is important because crushing negatively affects the modular system and the ability to mount and support the exterior wall cladding 19. Although Poly-Iso is preferred, it is contemplated that other products, having similar characteristics of rigidity, resistance to compression, resistance to thermal conductivity, ease of cutting, flame resistance, resistance to moisture penetration, and the like may similarly be used for the rigid insulation panels 30.

Vertical girder 20, as shown in FIGS. 4-8, is elongate having first lower end portion 21, second upper end portion 22, a front portion 23, an opposing rear portion 24, a first side 25 communicating between the front portion 23 and the rear portion 24, and an edge lip 26 opposite first side 25, communicating with the rear portion 24 and extending toward the front portion 23 but not communicating therewith. Gap 29 is defined between the edge lip 26 and the front portion 23 which minimizes thermal conductivity of the vertical girder 20 by interconnecting the front portion 23 and the rear portion 24 only via the first side 25. The vertical girder 20 has a rigid shape similar to that of a box, from an end view, so that it is resistant to bending and can transfer the weight of the exterior cladding 19 to the insulative panel 30 and utilize the compressive strength of the insulative panel 30 to support exterior cladding 19 loads by converting tensive forces (not shown) on fasteners 48 into compressive forces (not shown) on the insulative panel 30. More precisely, as the fastener 48 is pulled downwardly by the weight of the cladding 19 supported by the vertical girder 20, the fastener 48 is also pulled inwardly toward the wall 10. Structurally, however, inward movement of the fastener 48 cannot occur because the insulative panel 30 under the vertical girder 20 prevents the inward movement. As a result the downward forces on the fastener 48 generate compressive loads on the insulative panel 30, which are dispersed across a larger surface area.

Cladding fastener holes 27 defined in the front portion 23 provide a means for attaching a desired exterior wall cladding 19 directly to the front portion 23 of the vertical girder 20 with fasteners 131.

Anchoring fastener holes 28, 28*a* defined in the front portion 23 and in the rear portion 24 of the vertical girder 20 are vertically and horizontally aligned. Anchoring fastener hole 28*a* defined in the front portion 23 is diametrically larger than the aligned anchoring fastener hole 28 defined in the rear portion 24 to accommodate a radially enlarged head portion of fastener 48 and thermal isolator 105 carried on the fastener 48. (FIG. 8).

The thermal isolator 105 is preferably in the shape of an annulus and is formed of a moldable material such as nylon, polyamide, polyester, PVC or the like, including but not limited to "blends" thereof which are known for their thermal insulating characteristics. The thermal isolator 105 may also have a fastening hole shoulder (not shown), that has a thickness equal to the thickness of the rear portion 24 of the vertical girder 20, which extends into the anchoring fastener hole 28 to thermally isolate the fastener 48 from the vertical girder 20. The thermal isolator 105 prevents metal to metal contact between the fastener 48 and the vertical girder 20 which provides thermal isolation between the fastener 48 and the vertical girder 20 and between the vertical girder 20 and the wall studs 14 and everything outward of the vertical girder 20.

Figure 3:
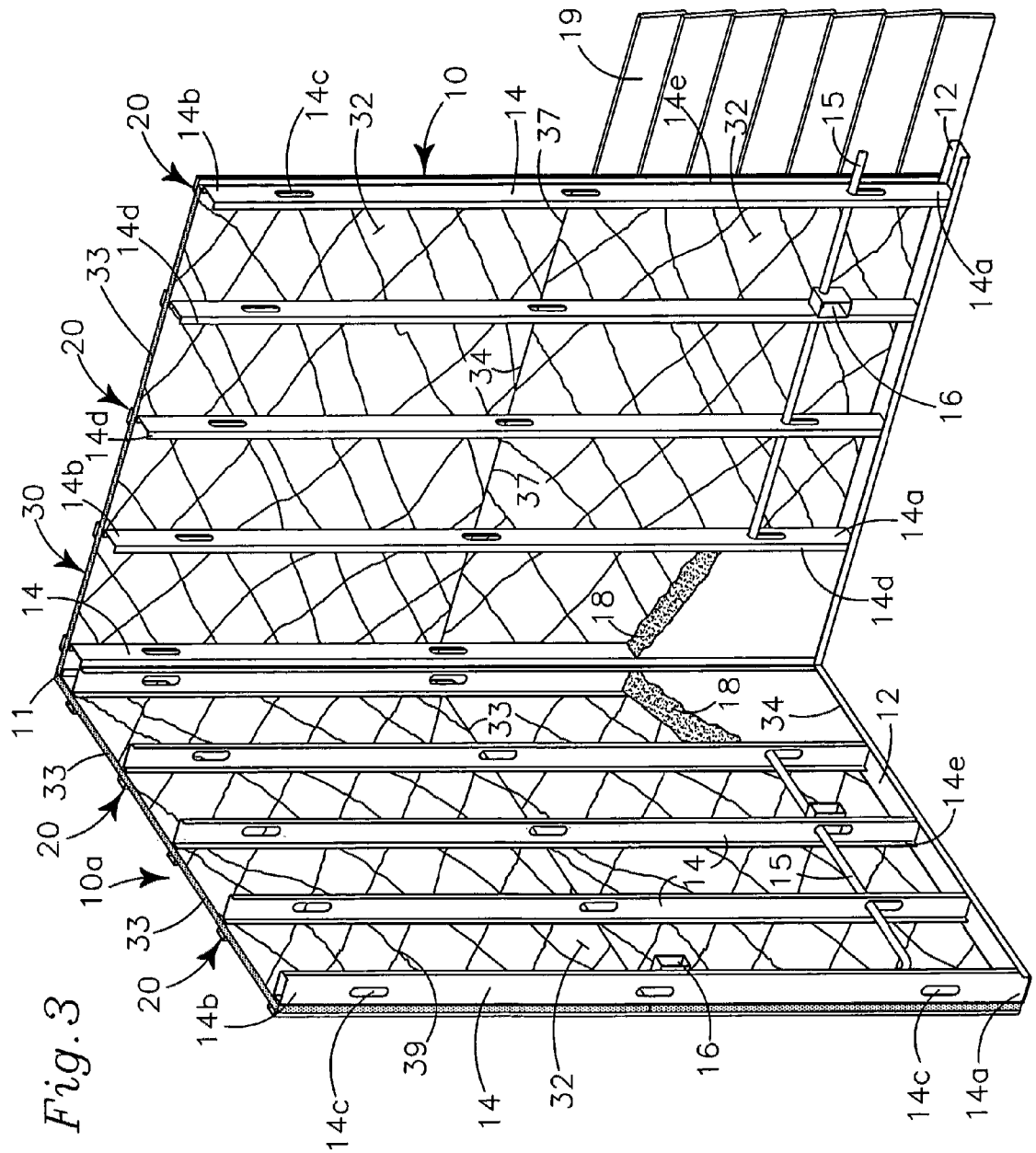
FIG. 3 is an isometric top and side view of the interior corner of the wall portion of FIG. 2 showing insulation filling the voids between some of the wall studs, horizontally aligned service holes defined in the wall studs and electrical service conduits extending therethrough.

As shown in FIGS. 1, 2, and 3, two walls 10, 10*a* forming a corner 11 are constructed with plural wall studs 14. Rigid insulation panels 30 are positioned against the outward facing edges 14*e* of the wall studs 14 and are temporarily held in position by known means. Joints 37 between adjacent insulation panels 30, which extend horizontally and vertically are covered with joint covering tape 38. In the preferred embodiment the joint covering tape 38 has a covering (not shown) opposite an adhesive side (not shown) which is heat reflective and flame resistant.

Vertical girders 20 are positioned against the outward facing side 31 of the insulation panels 30 and aligned with the wall studs 14 on the inward side of the insulation panels 30. Fasteners 48 which are preferably self-tapping and carrying thermal isolators 105 are inserted through the anchoring fastener holes 28*a*, 28 defined in the front and rear portions 23, 24 respectively of the vertical girders 20, to pass through the insulation panel 30 and threadably engage with the wall studs 14. The vertical girders 20 secure the insulation panels 30 against the wall studs 14.

As shown in FIG. 3, interior insulation 18 such as expanding foam, fiberglass batting, recycled cellulose or the like may be installed adjacent the inward side 32 of the insulation panels 30, or adjacent the inner side of the sheathing or weather restrictive barrier (not shown) to extend between the spacedly adjacent wall studs 14 and extending inwardly from the insulation panels 30 or sheathing to the inward facing edge portions 14*d* of the wall studs 14. Expanding foam-type insulation 18 allows the insulation to expand about the utility conduits 15 and utility boxes 16 filling any gaps and voids. Interior insulation 18 between the wall studs 14 further reduces thermal conductivity of the wall assembly.

In a preferred embodiment, exterior cladding 19, such as lap board (FIG. 2) is fastened directly to the front portion 23 of the vertical girders 20 with fasteners 131 extending through the exterior cladding 19 and engaging in the cladding fastener holes 27. Other types of exterior cladding, including but not limited to wood panels, composite panels, siding, OSB and metallic panels may also be attached directly to the front portion 23 of the vertical girders 20 to provide exterior cladding 19 for the structure outward of the continuous insulation thereunder.

In a second embodiment, wall panels 50 may be used to provide a light-weight panelized type exterior cladding for the structure.

When wall panels 50 are used to clad the exterior of the structure, elongate U-shaped hangers 85 (FIGS. 1, 10-14) are secured to the front portion 23 of the vertical girders 20 with fasteners (not shown) that engage in the cladding fastener holes 27 so that the U-shaped hangers 85 extend generally horizontally to the ground surface and perpendicular to the vertical girders 20. (FIG. 1). Each U-shaped hanger 85 has a first end portion 86, a second end portion 87 and has a U-shaped cross-section (FIG. 14) with an outer side portion 88 having a hanging edge 88*a*, an inner side portion 89 for positioning adjacent the vertical girder 20, and a perpendicular bottom portion 90 communicating between the outer side portion 88 and the inner side portion 89. Channel 94 is defined by the outer side portion 88, the inner side portion 89 and the bottom portion 90. A plurality of spacedly arrayed drainage holes 91 are defined in the outer side portion 88 and a plurality of spacedly arrayed fastener holes 92 are defined in the inner side portion 89 along the length of the U-shaped hanger 85.

The distance between the outer side portion 88 and the inner side portion 89 of the U-shaped hanger 85, plus the distance between the front portion 23 and the rear portion 24 of the vertical girder 20 creates a pressure equalized rainscreen within the wall assembly for moisture management.

As shown in FIGS. 15-17, each wall panel 50 is rectilinear and has a front outer side portion 51, a rear inner side portion 52, a bottom edge 54, a top edge 53 defining an offset edge portion 53*a* extending the length thereof, a first lateral edge 55 defining an offset edge portion 55*a* extending the length thereof and an opposing second lateral edge 56. The first lateral edge 55, and the offset edge portion 55*a* thereof, and second lateral edge 56 extend between the top edge 53 and the bottom edge 54 and are perpendicular thereto.

A plurality of spacedly arrayed cutouts 57, each having a rearwardly and downwardly angled hanging flange 58 proximate the top edge 53 are defined in each wall panel 50. Each hanging flange 58 is offset toward the rear side portion 52 as best shown in FIG. 17. A plurality of grout tangs 59 are defined in the wall panel 50 and are spacedly arrayed about the cutouts 57 to increase frictional communication with grout 124 to increase bonding with a desired facing element. The grout tangs 59 may be offset toward the front side portion 51 as shown in FIG. 17.

Offset edge portions 53*a*, 55*a* overlap adjacent edge portions 54, 56 of adjacent wall panels 50 to provide strength and rigidity at the interconnections therebetween. Hanging flanges 58 overhang and frictionally engage with hanging edges 88*a* of the U-shaped hangers 85 with the hanging flanges 58 extending downwardly into channel 94 between the outer side portion 88 and the inner side portion 89 which allows the wall panels 50 and facing elements 120 carried thereon to be vertically and horizontally supported.

As shown in FIG. 1 plural vertically spaced U-shaped hangers 85 are secured to the vertical girders 20 with fasteners (not shown) extending through the fastener holes 92 defined in the inner side portion 89 and thereafter into the cladding fastener holes 27 defined in the front portion 23 of the vertical girders 20. The vertical distance between the hanging edges 88*a* of the vertically spacedly adjacent U-shaped hangers 85 is a multiple of the vertical distance between vertically spacedly adjacent hanging flanges 58 of the wall panels 50 so that each wall panel 50 is supported by the hanging edges 88*a* of plural U-shaped hangers 85.

Various forms and types of facing elements may be secured to the front outer side portion 51 of each wall panel 50, and such facing elements may include, but not be limited to, brick-like tiles 122 (FIG. 26), masonry panels 121, (FIG. 27), large tiles 133 (FIG. 28), sheet metal 123 such as but not limited to copper (FIG. 30), stone 120 (FIG. 29) composite (not shown) and the like. Because such facing elements are supported by the wall panels 50, the front to back thickness of the facing elements need not be great because the support for such facing elements is the wall panel 50, the U-shaped hangers 85, the vertical girders 20 and the rigid insulation panels 30.

Figure 19:
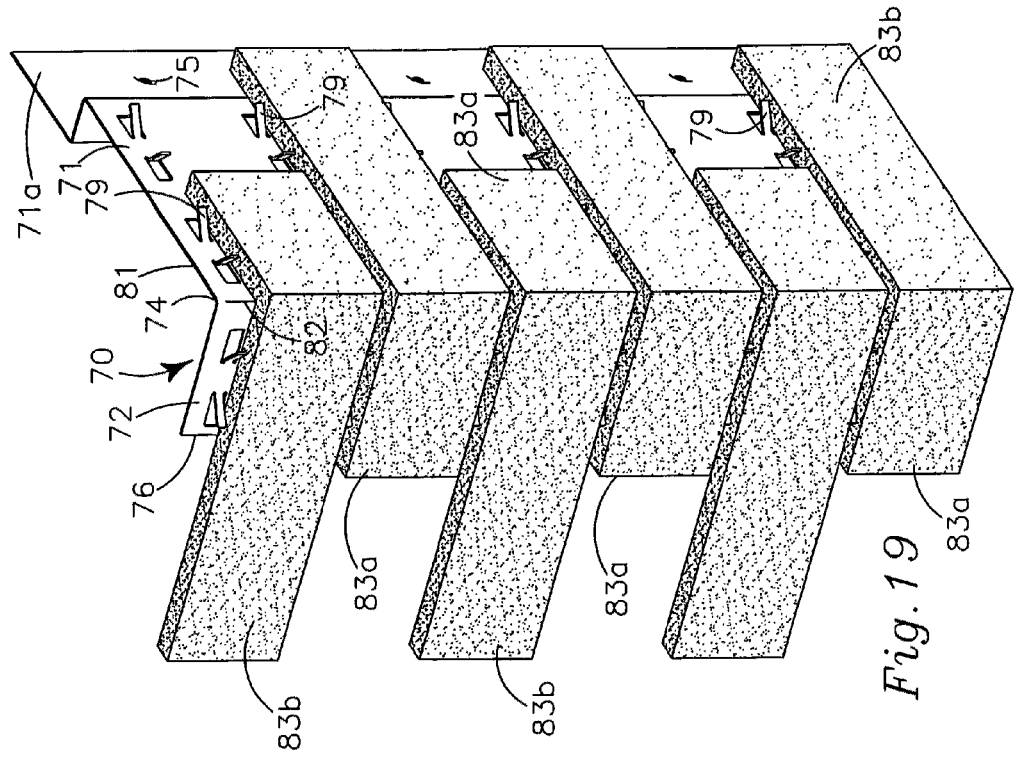
FIG. 19 is an isometric front, top and second side view of the corner element of FIG. 18.
Figure 18:
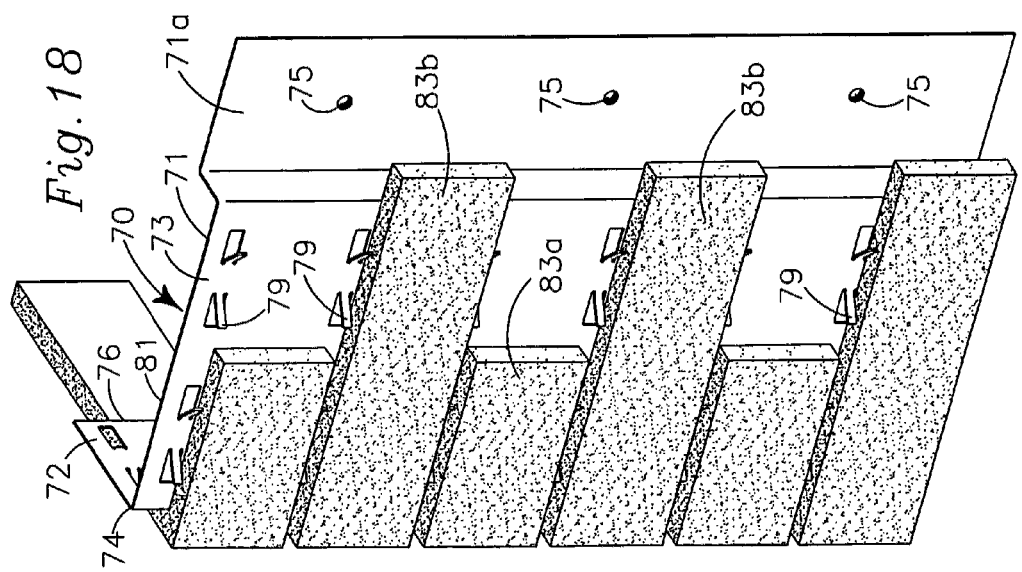
FIG. 18 is an isometric front, top and first side view of a corner element carrying corner brick tile cladding elements.

As shown in FIGS. 18 and 19, corner element 70 has a backing frame 81 with a first leg 71, a second leg 72, a top edge 73 and a bottom edge (not shown). Offset edge portion 71*a* extends along the length of the first leg 71 opposite the second leg 72 from the top edge 73 to the bottom edge (not shown) and facilitates joining of corner element 70 with vertical girder 20 while preserving a flexible interconnection with an adjacent wall panel 50. Grout tangs 79 are spacedly arrayed about the corner element 70 to provide additional frictional engagement with grout 124. Corner element 70 may be covered with brick-like tiles 83 or other coverings that are "L" shaped (in a plan view) so that the tiles 83 extend around corner 74. When brick-like tiles 83 are used, it is desirable that first leg 83*a* be shorter than second leg 83*b* to visually represent the thickness of a brick and to prevent a straight vertical line proximate the corner 11 which would provide unappealing visual evidence to an observer that the structure is covered in a cladding system. Grout 124, is used to fill gaps between the brick-like tiles 83 and to fill gaps between adjacent wall panels 30 and adjacent corner elements 70.

Fastener holes 75 are defined in the offset edge 71*a* of the corner element 70 to carry fasteners (not shown) that extend therethrough and threadably engage with vertical girder 20 or U-shaped hanger 85.

There is no structural interconnection between corner elements 70 and spacedly adjacent wall panels 50. Instead, wall panels 50 and corner elements 70 are independently fastened to the vertical girders 20, or to the U-shaped hangers 85. The absence of a direct mechanical interconnection between the corner elements 70 and the wall panels 50 allow spaces between the brick-like tiles 122 of the corner element 70 and of the adjacent wall panels 50 to be filled with a flexibly resilient grout 124 that is impregnated with chips of mineral or metal so that the grout 124 has a visual appearance of mortar-type grout 124. In the preferred embodiment the grout 124 is silicone based and is flexibly resilient which allows for thermal expansion and contraction that might occur and prevents the formation of cracks that might otherwise develop if mortar-type grout is used. Further, the absence of mechanical interconnection between the wall panels 50, and the corner elements 70 provides a flexing joint in the wall cladding system that can accommodate movements, vibrations, expansions and contractions caused by forces such as, but not limited to, wind, seismic activity, thermal expansion and building shrinkage. Finally, the absence of mechanical interconnection of the wall elements 50 and the corner elements 70 provides some amount of flexibility in the installation of the cladding system to adjust for inaccuracies, warps, bulges and the like that make walls 10 less than perfectly planar and corners less than perfect right angles.

In another embodiment (FIG. 20-24) such as when' an existing structure is to be clad with a new exterior, J-channel girders 40 (FIGS. 22-24) may be secured to the exterior of the structure in spaced apart vertical array, using angle brackets 100 and threaded fasteners 48 which may be self-tapping. Each angle bracket 100 has a first leg 101 and a perpendicular second leg 102 with a corner 103 therebetween interconnecting the first leg 101 and the second leg 102. Fastener holes 104 are defined in the first leg 101 and in the second leg 102. In a preferred embodiment the angle bracket 100 is formed of stainless steel because stainless steel is less thermally conductive than common carbon steel including steel that has been galvanized.

The angle bracket 100 is mounted to an exterior wall 13 so that the first leg 101 is adjacent to the exterior wall 13 and a fastener 48 extending through the fastener hole 104 and engages with a wall stud 14 or underlying wall support (not shown). The second leg 102 extends perpendicularly outwardly from the exterior wall 13.

As shown in FIGS. 22 and 23, J-channel girder 40 is elongate having a first lower end portion 41, and a second upper end portion 42 and has a cross-section similar to a "J" with a front side portion 43, a second plumbing side portion 44, and an insulation lip portion 45. The second plumbing side portion 44 and the insulation lip portion 45 are parallel to one another with the front side portion 43 extending therebetween interconnecting the second plumbing side portion 44 and the insulation lip portion 45 at proximate edge portions thereof. Plural spacedly arrayed elongated adjustment holes 47 are defined in the second plumbing side portion 44 of the J-channel girders 40 to provide a means for mounting the J-channel girder 40 to the second leg 102 of angle brackets 100.

As shown in FIG. 25, bracket thermal isolators 106 are carried between the J-channel girder 40 and the angle bracket 100, and a second bracket thermal isolator 106 may be carried between the first leg 101 of the angle bracket 100 and the structure exterior wall 13. In the preferred embodiment the bracket thermal isolator 106 is planar and rectilinear in configuration and defines fastener hole 107 therein. The bracket thermal isolator 106 may also carry retaining tabs 108 that engage with retaining tab holes 109 defined in second leg 102 of angle bracket 100. Bracket thermal isolator 106 may further have a fastener hole shoulder (not shown) that has a thickness equal to the thickness of the angle bracket 100 which extends into the fastener hole 104 of the angle bracket 100 to isolate fastener 113 from the adjoining surface of the angle bracket 100 to prevent metal to metal contact therebetween. The retaining tabs 108 provide a means for the bracket thermal isolator 106 to be attached to the angle brackets 100 at the fabricator which eliminates the need for an installer to handle and align each bracket thermal isolator 106 during installation of the wall system which promotes efficiency.

The bracket thermal isolator 106 is formed of a moldable material such as nylon, polyamide, polyester, PVC or the like, including but not limited to blends thereof which are known for their thermal insulating characteristics. The bracket thermal isolator 106 may likewise have configurations other than planar and rectilinear, such as having corrugations (not shown).

As shown in FIG. 25, fastener 113 extends through the fastener hole 104 defined in the second leg 102 of the angle bracket 100, through the fastener hole 107 defined in the bracket thermal isolator 106 and through the elongated adjustment hole 47 defined in the second plumbing side portion 44 of the J-channel girder 40. The elongated adjustment holes 47 provide a means for "plumbing" the wall cladding system to vertical as necessary, by moving the J-channel girder 40 closer to the exterior wall 13 or further away from the exterior wall 13 as necessary to change the vertical angle of the J-channel girder 40.

Front side portion 43 of the J-channel girder 40 provides a mounting surface for the exterior cladding 19, or for the U-shaped hangers 85. The insulation lip portion 45 retains and positionally maintains insulation 126 adjacent the exterior wall 13 and spaced apart from the exterior cladding 19 and apart from the U-shaped hangars 85 to maintain a rainscreen between the insulation 126 and the interior surface of the exterior cladding 19. Insulation clips 111 (FIGS. 10, 14) may also be attached to the inward side portion 89 of the U-shaped hangers 85 to positionally maintain the insulation 126, such as fiberglass batting, cellulose, mineral wool and the like spaced apart from inside surface of the exterior cladding 19 and the rear side 52 of the wall panels 50, which have the tendency to move toward the exterior cladding due to gravity loads and wind loads that cause pressure reductions within the wall. Space 131 between the outward most portion of the insulation 126 and the inner most surface of the exterior cladding 19 is known, in the industry, as a "rainscreen" that prevents moisture from passing from the exterior of the structure wall to the insulation and allows condensation to occur and dry within the wall assembly without detrimentally affecting the wall assembly and insulation 126.

The J-channel girder 40 embodiment provides a means for adding insulation 126 to the exterior of an existing structure, it provides a means for mounting exterior cladding 19 on an existing structure and it provides a means to "re-plumb" a wall 10 to vertical.

Mounting exterior cladding 19 on an existing structure, or refurbishing the exterior of an existing structure may be more economical using J-channel girders 40 as opposed to vertical girders 20 because of the additional adjustment features provided by the elongated adjustment holes 47 and angle bracket 100.

If plural panels of metal exterior cladding 19 (such as copper) are used to clad the exterior of a structure, either alone, or in combination with wall panels 50 covered in cladding 19 such as brick-like tiles 122, an edge portion of the metal cladding panel (not shown) may be bent over onto itself so that the bent edge portion forms a hanging edge (not shown). The metal wall panel with such a hanging edge may thereafter be engaged with the hanging edge 88a of the U-shaped hanger 85 to be supported thereon. Such a metal wall panel (not shown) does not require a supporting wall panel 50 thereunder, but may require customized placement and alignment of the U-shaped hanger 85 to accommodate the size of the metal wall panels having bent-over hanging edges.

Having described the structure of our modular system for cladding exterior walls of a structure and insulating the structure wall its operation may be understood.

A wall panel 50 is clad on its first front side portion 51 with a desired cladding element, such as brick-like tile 122. The desired cladding element is secured to the wall panel 50 with adhesive. If brick-like tiles 122 are used it is necessary to bend the grout tangs 59 forwardly prior to installation of the grout 124 so that grout tangs 59 extend into the grout 124 filling spaces 80 between the brick-like tiles 122.

The desired cladding elements are also applied to the first and second legs 71, 72 respectively of the corner elements 70 and secured thereto with known adhesive. If brick corner tiles 83 are fastened to the corner elements 70, the first leg 83a and second leg 83b are alternated so that first and second legs 83a, 83b respectively alternate on the first leg 71 and second leg 72 of the corner element 70.

Insulation panels 30 are placed adjacent against the outward facing edges 14e of the vertical wall studs 14, or against the exterior wall 13 of the structure that may be covered with a weather resistive barrier (not shown), and are held in position by known means so that the bottom edge 34 of one insulation panel 30 abuts the top edge 33 of the an adjacent rigid insulation panel 30. Likewise, the first lateral side 35 and second lateral side 36 of adjacent insulation panels 30 should abut. Preferably, the joints between the first lateral side 35 and second lateral side 36 of adjacent insulation panels 30 are directly aligned with a vertical wall stud 14. Joint covering tape 38 is used to seal the joints between adjacent wall panels 30 to prevent air flow and passage of moisture therethrough.

Vertical girder 20 is positioned against the first outer side 31 of the insulation panel 30 and aligned with a vertical wall stud 14 on the opposing second inner side 32 of the insulation panel 30. Fasteners 48 carrying thermal isolators 105 thereon are inserted through the anchoring fastener holes 28a, 28 defined in the front portion 23 and rear portion 24 of the vertical girder 20 and passed through the insulation panel 30 to engage with the vertical wall stud 14. Because the diameter of the anchoring fastener hole 28a defined in the front portion 23 of the vertical girder 20 is diametrically larger than the anchoring fastener hole 28 defined in the rear portion 24, the radially enlarged head of the fastener 48 and the thermal isolator 105 pass through the front portion 23 but cannot pass completely through the rear portion 24 so that the vertical girder 20 is secured to the wall stud 14 outward of the insulation panel 30. This feature also provides the front portion 23 as a flat mounting surface for attaching exterior cladding 19, or the U-shaped hangers 85. The vertical girder 20 positionally secures the insulation panel 30 to the outward facing edge portions 14e of the vertical wall studs 14 or to the exterior wall 13. The process of installing vertical girders 20 is continued so that the vertical girders 20 extend from the lowest desired level, to the upper-most desired level of the structure and are spacedly arrayed on the wall 10 in a configuration that will support the exterior cladding 19.

If exterior cladding 19 such as lap board, or metal sheeting, is to be fastened directly to the front portion 23 of the vertical girders 20, the exterior cladding 19 may be placed directly against the front portion 23 of the vertical girders 20 and fasteners 131 are used to attach the exterior cladding 19 by passing the fasteners 131 through the exterior cladding 19 and engaging the fasteners 131 in the cladding fastener holes 27 defined in the front portion 23 of the vertical girders 20. (FIG. 19).

If wall panels 50 and corner elements 70 are to be used to clad the structure, U-shaped hangers 85 are secured to the front portion 23 of the vertical girders 20 in vertically spaced parallel array with fasteners (not shown) extending through the front side 88 drain holes 91 and through the rear side 89 fastener holes 92 and engaging with the cladding fastener holes 27 defined in the front side portion 23 of the vertical girders 20. (FIG. 20). The U-shaped hangers 85 are oriented so that the first hanging edge 88a is the uppermost outward edge so that the hanging edge 88a may engage with and carry a wall panel 50 by engaging underneath the hanging ledges 58 of the wall panels 50.

The vertical spacing between the vertically spacedly adjacent first hanging edges 88a of the U-shaped hangers 85 is a multiple of the distance between vertically adjacent hanging ledges 58 of the wall panels 50 so that the hanging edges 58 of a single wall panel 50 engage with plural vertically spaced U-shaped hangers 85.

Corner elements 70 are installed at the structure corners 11 with fasteners (not shown) extending through fasteners holes 75 defined in the offset edge portion 71a of the corner elements 70. In the preferred embodiment, the fasteners (not shown) engage with the cladding fastener holes 27 defined in the front portion 23 of the vertical girders 20, and plural corner elements 70 are installed on the structure corner 11 in vertical alignment extending from the lowest desired level to highest desired level.

If the corner elements 70 cannot be anchored to the vertical girders 20, the corner elements 70 may be secured to the U-shaped hangers 85.

The previously prepared wall panels 50 are positioned adjacent to the structure wall 10, and are lifted into position and placed in direct frictional contact with the outer side portions 88 of the U-shaped hangers 85, so that the first hanging edge portions 88a of the U-shaped hangers 85 frictionally engage with the second rear side portion 52 of the wall panel 50 spacedly below a hanging ledge 58. Thereafter the wall panel 50 is lowered so that the hanging edge 88a of the U-shaped hangers 85 passes underneath and engages with the hanging ledges 58 of the wall panel 50. Fasteners (not shown) are passed through the uncovered edge portions of the wall panel 50 to engage with and positionally secure the wall panel 50 to the U-shaped hangers 85. Thereafter, additional wall panels 50 are positioned against the U-shaped hangers 85, are lowered into position to engage therewith and are positionally manipulated so that adjacent edge portions 55, 56 of adjacent wall panels 50 abut. Fasteners (not shown) are used to positionally secure the wall panels 50 to the U-shaped hangers 85.

In locations where the desired exterior cladding 19 has not been previously secured to the wall panels 50, such as the alternating brick tile positions that extend across adjoining edges of adjacent wall panels 50, brick tiles 122 are added to those locations. Grout 124 is added to the spaces 80 between the brick tiles 122 to complete the appearance of brick construction.

Silicone based grout 124 having a color similar to that of mortar based grout is impregnated with minerals or metallic chips having a desired color. The mineral or metallic chips provide the silicone grout 124 with the appearance and texture of mortar based grout, but retains resiliency and flexibility, and is resistant to formation of cracks and gaps. Silicone based grout 124 is also used to fill the spaces 80 between the edges of the wall panels 50 and the adjacent edges of the brick corner tiles 83 covering the corner elements 70.

If the second embodiment of our modular system is used, and the wall cladding panels 50 are to be installed on an existing structure, the process of installing the wall panels 50, and corner elements 70 is similar to that described above, however, J-channel girders 40 are installed on the exterior wall 13 of the structure using angle brackets 100 and fasteners 48. The J-channel girders 40 and angle brackets 100 provide adjustment means allowing the structure walls to be "plumbed" to vertical if necessary.

The angle brackets 100 are secured to the exterior wall 13 of the structure. First leg 101 of the angle bracket 100 is secured to the exterior wall 13 of the structure with a fastener 48 carrying a thermally insulating washer (not shown) in alignment with vertical wall studs 14, or other structural elements (not shown) supporting the wall 10 with a bracket thermal isolator 106 between the first leg 101 and the exterior wall 13.

Angle brackets 100 are installed in spaced array in sufficient numbers to support the plural J-channel girders 40 on the wall 10. It is critical the vertical spacing of the angle brackets 100 on the exterior 13 of the wall 10 is a multiple of the vertical spacing between the elongated adjustment holes 47 defined in the second plumbing a side portion 44 of the J-channel girders 40.

Vertical spacing of the angle brackets 100 should be adjusted so that end portions of the J-channel girders 40 are vertically offset from the horizontally adjacent J-channel girders 40 to prevent the joints (not shown) from being horizontally aligned on the structure which might cause a structural weakness at one particular vertical height.

The number of angle brackets 100 installed on the structure to support the exterior cladding 19 is dependent upon the engineering calculations that take into account the weight of the cladding 19, predicted wind loads, traffic vibration, and the like. Because the angle brackets interrupt the insulation 126 and affect the performance of the insulation it is preferable to use the minimum number of angle brackets 100 that will safely meet required engineering load calculations and safety tolerance.

After the angle brackets 100 have been secured to the exterior wall 13 of the structure, the J-channel girders 40 are placed adjacent to the second legs 102 of the angle brackets 100 extending perpendicularly outwardly from the exterior wall 13 of the structure. Fastener holes 104 defined in the second leg 102 of the angle brackets 100 are horizontally and vertically aligned with the elongated adjustment holes 47 defined in the J-channel girders 40. Bracket thermal isolator 106, if not already attached to the angle bracket 100, is placed between the second leg 102 of the angle bracket 100 and the proximate surface of the J-channel girder 40.

Fastener 113 carrying a thermally insulating washer (not shown) is inserted through the through the fastener hole 104 defined in the second leg 102 of the angle bracket 100, through fastener hole 107 defined in the bracket thermal insulator 106, and through the elongated adjustment hole 47 defined in the J-channel girder 40. A second thermally isolating the washer (not shown) is placed on the end portion of the fastener 113 extending through the J-channel girder 40, and the bracket thermal isolator 106 and the second leg 102 of the angle bracket 100, and thereafter a complementary portion of the fastener 113 such as a threaded nut (not shown) is engaged with the fastener 113 to secure the fastener 113 in place.

Similar fasteners 113 are inserted through the remaining elongated adjustment holes 47 defined in the J-channel girders 40, through the bracket thermal isolators 106 and the second legs 102 of the angle brackets 102 securing the J-channel girder 40 to the angle brackets 100.

Before the fasteners 113 interconnecting the J-channel girders 40 and the angle brackets 100 are tightened, adjustments should be made to ensure that the J-channel girders 40 are vertical. The adjustment is made by adjusting the position of the J-channel girder 40 relative to the angle bracket 100 by sliding the J-channel girder 40 more proximate to, or more distal from the exterior wall 13 of the structure which responsively changes the angle of the J-channel girder 40 relative to the wall 13.

Insulation 126 is installed adjacent the exterior wall 13 to extend between the spaced apart J-channel girders 40. The lip portion 45 of the J-channel girders 40 as well as the insulation clips 111 retain and positionally maintain the insulation 126 against the exterior wall 13 and prevent the insulation 126 from expanding or moving outwardly into direct contact with the interior surface of the wall cladding 19, or wall panels 50 and maintain the rainscreen 134. Thereafter, the exterior cladding 19 may be fastened directly to the front side portion 43 of the J-channel girders 40 with fasteners 131 extending therethrough, or U-shaped hangers 85 may be attached to the front side portion 43 of the J-channel girders 40 and thereafter wall panels 50 and corner elements 70 may be attached to the structure, similar to the process described above.

Having thusly described our invention, what we desire to protect by Utility Letters Patent and what we claim is:

1. A modular system for cladding exterior walls of an existing structure and insulating the existing structure walls comprising in combination:
plural vertical girders fastened to the structure walls in spaced vertical array, each vertical girder defining plural spacedly arrayed holes and having,
a first end portion and an opposing second end portion,
a front portion distal from and parallel to the structure wall,
a side portion communicating with an elongate edge of the front portion and extending perpendicular to the front portion toward the structure wall, and
an edge lip portion opposite the side portion extending parallel to the side portion;
thermally insulating material positionally maintained adjacent the structure wall by the vertical girders;
exterior cladding for the existing structure supported by the vertical girders and spaced apart from the thermally insulating material creating a rain screen between a portion of the exterior cladding proximate the structure wall and a portion of the thermally insulating material distal from the structure wall;
thermal isolators communicating with the plural vertical girders;
fasteners extending simultaneously through at least one of the plural spacedly arrayed holes defined in the vertical girders and the thermal isolators and engaging with the existing structure wall to minimize thermal transfer from the vertical girders through the fasteners to the structure wall;
plural elongate U-shaped hangers releasably attached to the front portion of the vertical girders extending generally perpendicularly to the vertical girders and generally parallel to the structure wall, each U-shaped hanger having,
a first end portion and an opposing second end portion,
an inner side portion adjacent the front portion of the plural vertical girders,
an outer side portion spaced apart from and parallel to the inner side portion,
a bottom portion communicating between lower edges of the outer side portion and the inner side portion,
plural spacedly arrayed holes defined in the outer side portion and the inner side portion, and
a hanging edge on the outer side portion opposite the bottom portion;
plural wall panels that releasably engage with the hanging edge of the plural elongate U-shaped hangers to depend from the U-shaped hangers, each wall panel having
a front portion and an opposing rear portion,
a top edge and a spaced apart bottom edge, the top edge having an offset edge portion offset towards the rear portion,
a first lateral edge and a spaced apart second lateral edge extending between the top edge and the bottom edge, the first lateral edge having an offset edge portion offset towards the rear portion,
defining plural spacedly arrayed cutouts, each cutout having a hanging flange proximate the top edge and angled downwardly and outwardly towards the rear portion and the bottom edge, and
exterior cladding carried on the front portion of the wall panel;
corner elements releasably interconnectable to the U-shaped hangers at corners of the structure walls, each corner element having
a front portion and an opposing rear portion,
a first leg and a perpendicular second leg with a corner between the first leg and the second leg, the first leg having an offset edge portion opposite the corner that is offset towards the rear portion, and
exterior cladding carried on the front portion of the first leg and carried on the front portion of the second leg extending around the corner; and
grout that is flexibly resilient to fill gaps between spacedly adjacent edges of the exterior cladding carried by the wall panels and carried by the corner elements.

2. The modular system of claim 1 further comprising: a rear portion of the vertical girder communicating with an elongate edge of the side portion spaced apart from and parallel to the front portion, and the edge lip communicating with an elongate edge of the rear portion extends parallel to the side portion toward the front portion but does not communicate with the front portion defining a gap between the edge lip and the front portion to reduce thermal transfer; plural vertically spaced and horizontally aligned holes are defined in the front portion and in the rear portion of the vertical girder; at least one of the plural vertically spaced holes defined in the front portion is diametrically large enough to allow the thermal isolator and fastener to pass completely therethrough; and at least one of the plural vertically spacedly holes defined in the rear portion of the vertical girder horizontally aligned with the diametrically larger hole defined in the front portion is diametrically smaller so that the thermal isolator cannot pass completely therethrough.

3. The modular system of claim 2 wherein:
each plural vertical girder defines plural vertically spaced elongate holes in the side portion;
the vertical girder is adjustably attached to a leg of an angle bracket fastened to the structure wall with a releasable fastener extending through a hole defined in the leg of the angle bracket and through at least one of the plural vertically spaced elongate holes defined in the side portion of the vertical girder; and
the thermal isolator is carried between the angle bracket leg and the vertical girder side.

4. The modular system of claim 1 wherein:
the thermally insulating material is a plurality of planar rigid panels of thermal plastic and the plurality of planar rigid panels are positioned adjacent outward of the structure wall and adjacent inward of the vertical girders;
adhesive tape is used to cover and seal joints at abutting edges of adjacent rigid panels to prevent air flow through the joints; and
fasteners attaching the vertical girders to the structure wall penetrate through the thermally insulating material to engage with the structure wall.

5. The modular system of claim 1 wherein:
the thermally insulating material is polyisocyanurate.

6. The modular system of claim 1 wherein:
the exterior cladding is fastened directly to the front portion of the vertical girders.

7. The modular system of claim 1 wherein:
the exterior cladding is indirectly mounted to the front portion of the vertical girders.

8. The modular system of claim 1 wherein:
the modular system provides a continuously insulated wall assembly that satisfies ASHREA 90.1 definition for continuous insulation.

9. The modular system of claim 1 wherein:
the vertical girders may be adjustably positioned relative to the structure walls to adjust the angle of the exterior cladding relative to the structure walls.

10. The modular system of claim 1 wherein:
the exterior cladding is brick tiles fastened to planar panels forming a wall panel with a thickness less than 1 inch total.

11. A continuously insulated wall assembly for supporting exterior cladding on an existing structure's exterior walls comprising in combination:
plural vertical girders fastened to the existing structure walls in spaced array, each vertical girder defining plural spacedly arrayed holes and having,
  a first end portion and an opposing second end portion,
  a front portion and a spaced apart parallel rear portion,
  a side portion communicating between proximate elongate edges of the front portion and the parallel rear portion and extending perpendicularly to the front portion and the rear portion,
  an edge lip communicating with the elongate edge of the rear portion opposite the side portion and parallel to the side portion extending toward the front portion but not communicating with the front portion forming a gap between the edge lip and the proximate elongate edge of the front portion;
thermally insulating material positionally maintained adjacent the existing structure's exterior wall by the vertical girders, the thermally insulating material being in the form of plural rigid planar panels, each rigid planar panel having
  a top edge and an opposing bottom edge,
  a first lateral edge and opposing second lateral edge, the lateral edges extending between the top edge and the bottom edge, and
  an inner side and an outer side;
plural fasteners securing the vertical girders and the thermally insulating material adjacent the existing structure walls, the plural fasteners extending completely through at least one of the plural spacedly arrayed holes defined in the front portion of the vertical girder and through a horizontally aligned hole defined in the rear portion of the vertical girder and completely through the thermally insulating material to engage with the existing structure's exterior wall;
exterior cladding supported by the vertical girders and spaced apart outwardly from the thermally insulating material creating a rain screen between an inner portion of the exterior cladding and an outward portion of the thermally insulating material; and
thermal isolators carried on the fasteners extending partially through at least one of the plural spacedly arrayed holes defined in the rear portion of the vertical girders to thermally isolate the vertical girder from the fastener by preventing direct physical contact between the fastener and the vertical girder.

12. The modular system of claim 11 further comprising:
plural elongate U-shaped hangers attached to the front portion of the vertical girders extending generally perpendicularly to the vertical girders, each U-shaped hanger having,
  a first end portion and an opposing second end portion,
  an inner side portion adjacent the front portion of the plural vertical girders,
  an outer side portion spaced apart from and parallel to the inner side portion,
  a bottom portion communicating between lower edges of the outer side portion and the inner side portion,
  plural spacedly arrayed holes defined in the outer side portion and the inner side portion, and
  a hanging edge on the outer side portion opposite the bottom portion;
plural wall panels that releasably engage with the hanging edge of the U-shaped hangers to depend from the U-shaped hangers, each wall panel having
  a front portion and an opposing rear portion,
  a top edge and an opposing bottom edge, the top edge having an offset edge portion offset towards the rear portion,
  a first lateral edge and a second lateral edge extending between the top edge and the bottom edge, the first lateral edge having an offset edge portion offset towards the rear portion,
  defining plural spacedly arrayed cutouts, each cutout having a hanging flange proximate the top edge and angled downwardly and outwardly towards the rear portion and the bottom edge, and
exterior cladding carried on the front portion of the wall panel;
corner elements carried by the U-shaped hangers at corners of the structure walls, each corner element having,
  a front portion and an opposing rear portion,
  a first leg and a perpendicular second leg with a corner between the first leg and the second leg, the first leg having an offset edge portion opposite the corner that is offset towards the rear portion, and
exterior cladding carried on the front portion of the first leg and carried on the front portion of the second leg extending around the corner; and
grout that is flexibly resilient to fill gaps between adjacent edges of the cladding carried by the wall panels and by the corner elements.

* * * * *